United States Patent [19]

Remer et al.

[11] Patent Number: 5,453,829
[45] Date of Patent: Sep. 26, 1995

[54] PROCEDURE AND DEVICE FOR MEASUREMENT OF EXPOSURE TIMES IN OPTICAL DEVICES WITH MICROSCOPIC ILLUSTRATION PATH

[75] Inventors: Lucius Remer, Morfelden-Walldorf; Manfred Gilbert, Solms; Frank Hermann, Koblenz, all of Germany

[73] Assignee: Leica Mikroskopie und Systeme GmbH, Wetzlar, Germany

[21] Appl. No.: 244,173

[22] PCT Filed: Sep. 15, 1993

[86] PCT No.: PCT/DE93/00863

§ 371 Date: Jul. 19, 1994

§ 102(e) Date: Jul. 19, 1994

[87] PCT Pub. No.: WO94/07164

PCT Pub. Date: Mar. 31, 1994

[30] Foreign Application Priority Data

Sep. 21, 1992 [DE] Germany ............ 42 31 506.9

[51] Int. Cl.[6] ........................................ G01J 1/42
[52] U.S. Cl. ............... 356/218; 356/219; 356/225; 359/381; 359/372; 354/79
[58] Field of Search ............ 356/432, 218–219, 356/225; 359/372–374, 381; 354/79

[56] References Cited

U.S. PATENT DOCUMENTS 4,983,997  1/1991  Kraft .................................. 354/79

FOREIGN PATENT DOCUMENTS 0265773  5/1988  European Pat. Off. .
2908334  10/1979  Germany .
3503175  4/1986  Germany .

*Primary Examiner*—Richard A. Rosenberger
*Assistant Examiner*—Jason D. Eisenberg
*Attorney, Agent, or Firm*—Bean, Kauffman & Spencer

[57] ABSTRACT

A method and device for measurement of exposure times in optical devices are disclosed. Specifically, a measuring diaphragm plate and a mask plate are associated with a measurement path and a projection path of the optical device and include a plurality of corresponding measuring diaphragms and masks, respectively. A graticule having markings corresponding to the contours of the measuring diaphragms is provided in the projection path proximate the mask plate and conjugate to an intermediate image plane, and a motor for selectively positioning a measuring diaphragm on the measuring path is synchronized with a motor for positioning a corresponding mask on the projection path, such that a selected measuring diaphragm and its corresponding contour markings are simultaneously imaged at the intermediate image plane.

24 Claims, 5 Drawing Sheets

PROCEDURE AND DEVICE FOR MEASUREMENT OF EXPOSURE TIMES IN OPTICAL DEVICES WITH MICROSCOPIC ILLUSTRATION PATH

BACKGROUND OF THE INVENTION

1. Field of the Invention

The application pertains to a method as well as a device for measurement of exposure times in optical devices that have a microscopic imaging path, an observation path, a measuring ray path, and a projection path.

2. Description of the Prior Art

In the measurement of the exposure times in a photomicrographic device, a microscopic chamber or a photometric device, the light of the intermediate image is in most cases split into an observation and a measuring path. Furthermore, only a certain part of the viewing field is used for measurement. The known exposure measurement methods, or devices, respectively, can be divided into three system groups. They are depicted schematically in FIGS. 1–3.

FIG. 1 depicts an imaging path (A) and a measurement path (M) on its extension on which a pre-centered fixed measuring diaphragm (40) is positioned. An observation path (B) is diverted by the reflecting prism (41) with an eyepiece intermediate image plane (19). At location 19 an exactly adjusted graticule is located conjugate to the position of the measuring diaphragm image in the intermediate image. This known principle is used in simple camera attachments for microscopes. The disadvantage consists in the fact that only fixed measuring diaphragms are possible. Moreover, the image of the lines of the graticule (42) is not visible on dark areas of a specimen. Whereas it would be possible with this known projection principle to use several measuring diaphragms, the chosen measuring diaphragm cannot, however, be prominently imaged in the eyepiece.

In FIG. 2 an additional known variant is depicted in which a position and size variable measuring diaphragm (43) is reflected back to the eyepiece intermediate image plane (19) using a light source (L), a hinged mirror (44), a prism system (P) with a semi-transmissive surface (39) and a triple mirror (T). The form and position of a detailed measuring diaphragm is imaged in its temporary condition with this known arrangement. This principle is realized, for instance, in reverse mirror binotubes. The position variable measuring diaphragm of a camera attachment or the size variable measuring diaphragm of a photometer can be backwardly reflected. The greatest disadvantage of this arrangement is that it requires a high degree of optical and mechanical expense and that the occurring stray light part leads to undesirable lightened areas and reflections, because only a maximum of 25% of the light, that is projected back is available. Furthermore it is disadvantageous that the specimen is illuminated by the reverse projection at the diaphragm and can thus only be alternatively indicated or measured.

In the third known projection system, that also shows a measuring diaphragm (40) in the measuring path (M) and a prism system (P) with a semi-transmissive surface (39), the contour of the measuring diaphragm (40) is reflected to the eyepiece intermediate image plane (19) through the projection path (E). The carrier that shows the contours of the measuring diaphragm is positioned in the plane (45) that is conjugate to 19. The arrangement described in FIG. 3 is utilized for the format depiction in available photomicroscopic devices. It would be conceivable in principle to use synchronized continuously adjustable measuring and reflecting diaphragms. However, the movement as well as the form and/or size change of a measuring diaphragm would have to be exactly duplicated by the reflecting diaphragm positioned in the reflecting path (E). This would mean an extremely high mechanical expenditure which could not be realized under presently acceptable cost and manufacturing standards. An additional disadvantage of this third known reflecting principle is that variable measuring diaphragms and their complementary contours are very difficult to realize.

SUMMARY OF THE INVENTION

The task of the invention is thus to avoid the disadvantages of the known methods or arrangements respectively and to describe a reflecting method or system respectively in which the chosen measuring diaphragm position in the measuring path is at the same time prominently depicted in the observation path.

The task is solved through a method or device respectively of the above mentioned type, as it is described in claim 1 or in claim 5 in its characteristic parts. Additional advantageous designs result from the under claims.

BRIEF DESCRIPTION OF THE DRAWING

The method or the device respectively of this invention is more closely explained through the figures. They show in merely schematic depiction.

DESCRIPTION OF THE PREFERRED EMBODIMENT

Figure 1:
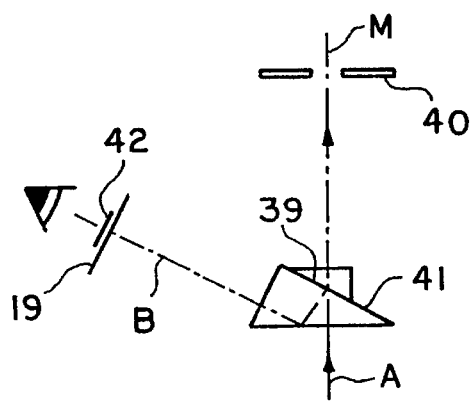
FIG. 1–3: three known exposure measuring methods or their corresponding devices, respectively.
Figure 2:
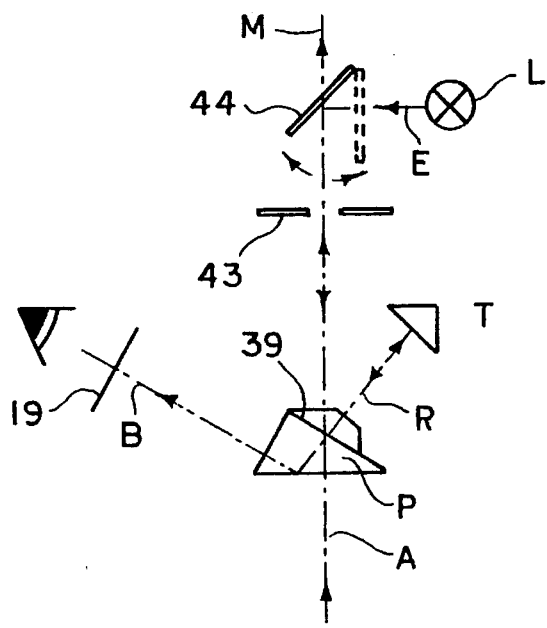
Figure 3:
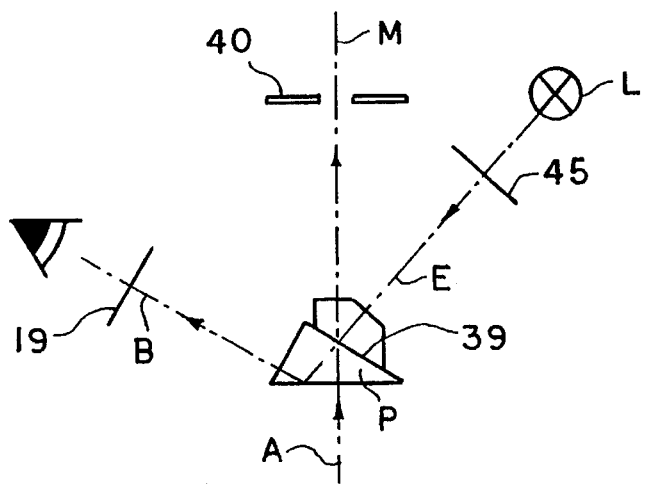
Figure 4:
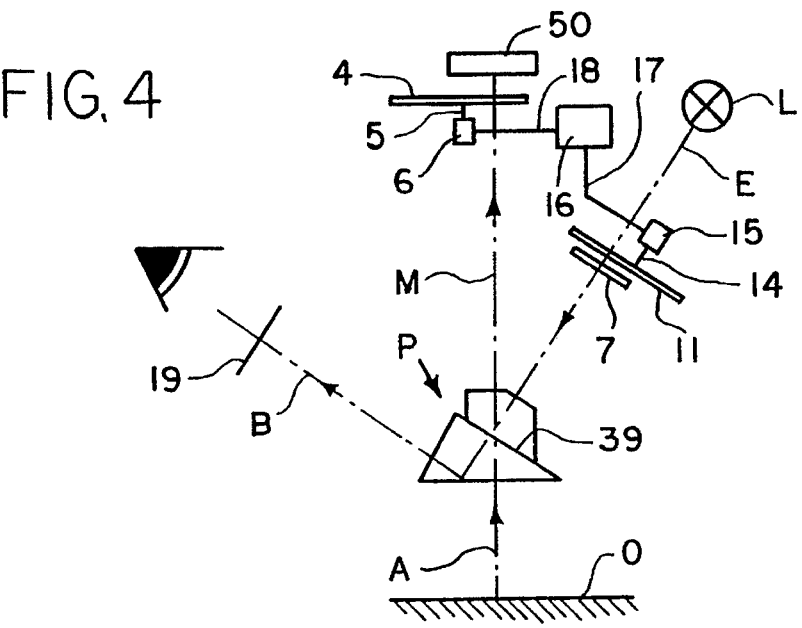
FIG. 4: a device according to this invention in its first design.

FIG. 4 schematically depicts the device according to this invention. The arrangement of the various ray path components was taken from FIG. 3. An imaging path (A) runs from an object (O) in the direction of a vertical optical axis of the total system towards a photometric measuring device (50). Its respective measuring path is marked with M. A prism system (P) contains a semi-transmissive surface (39), at which an observation path (B) is reflected. The eyepiece intermediate image plane is indicated in 19. A reflecting path (E) originates at a light source (L). A graticule (7) on the reflecting path (E) is located in a plane that is conjugate to 19 and the surface of an object (O). In its immediate vicinity a mask plate (11) is movably mounted by a motor (15) and a rotation axis (14). A measuring diaphragm plate (4) is located in the measuring path (M), also in a plane conjugate to 19, which is movably mounted by a motor (6) and a rotation axis (5). The reflecting path (E) runs in the area of the prism system (P) in such a way that it intersects the semi-transmissive surface (39) and coincides from there with the observation path. The synchronizing device (16) connects through wires (18 or 17, respectively) the motor (6) to the motor (15), respectively.

Figure 5A:
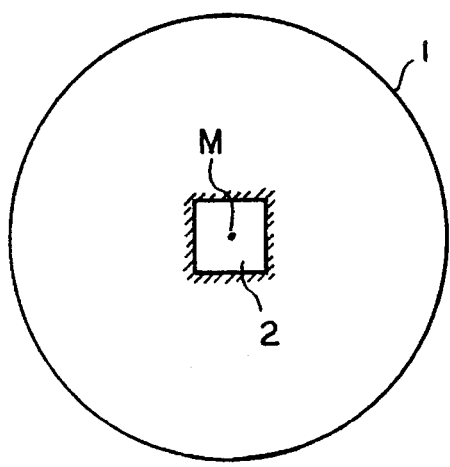
FIGS. 5a and 5b: two measuring diaphragms with differing dimensions in the viewing field.
Figure 5B:
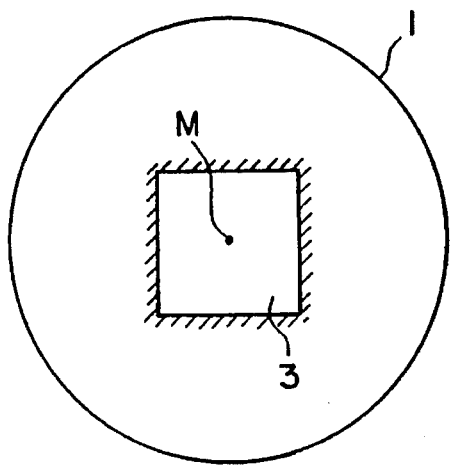
Figure 7:
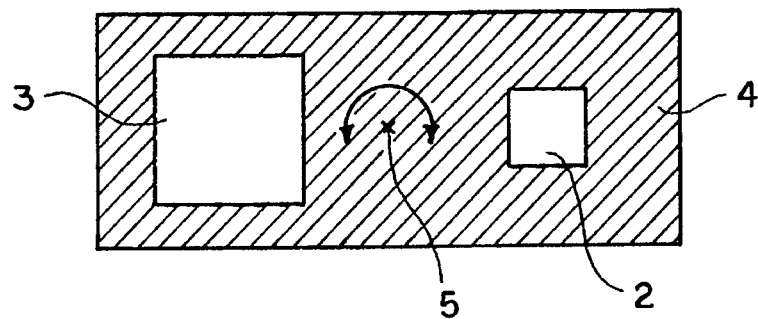
FIG. 7: a measuring diaphragm plate.

Two square apertures that function as the large measuring diaphragm (3) or the small measuring diaphragm (2) respectively. Small measuring diaphragm (2) and large measuring diaphragm (3) are depicted in the field of view (1) in FIGS. 5a and 5b, respectively. Measuring diaphragms (2) and (3) are located on the measuring diaphragm plate (4), that is designed as an opaque disk. This is shown in FIG. 7. The intersection point (5) indicates the location of the rotational axis of the measuring diaphragm plate (4). The spherical double vector is supposed to indicate that the plate (4) can be swung by the motor around the rotation axis (5).

Figure 6:
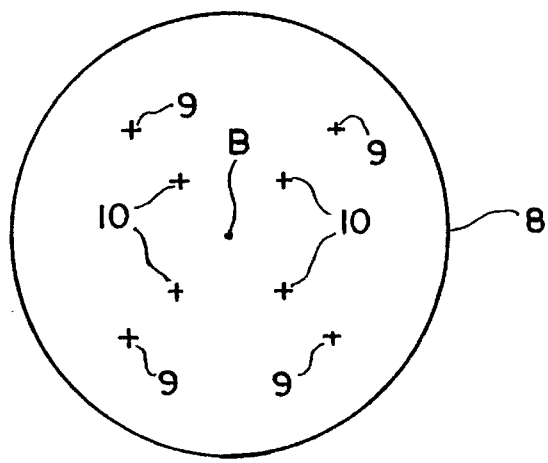
FIG. 6: a line image with images of contour fragments.
Figure 8A:
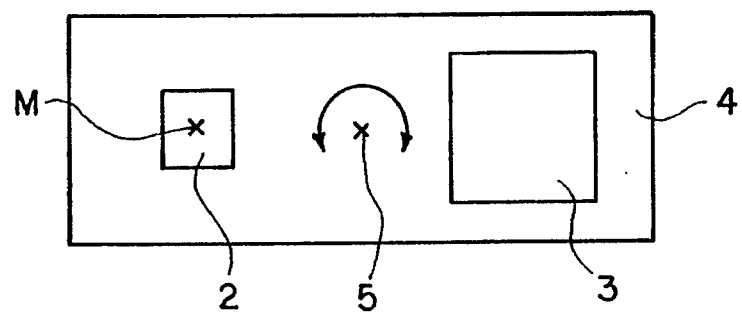
FIGS. 8a and 8b: two different working positions of the measuring diaphragm plate in the measuring path.
Figure 8B:
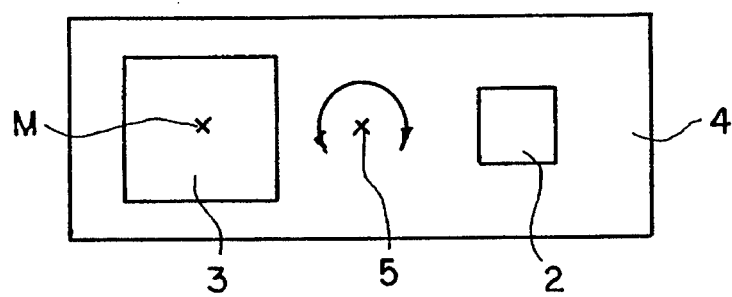

FIGS. 8a and 8b depict the two principal positions of the measuring diaphragm plate (4). In FIG. 8a the small measuring diaphragm (2) is in a working position, i.e. in the area of the measuring path (M). In FIG. 8b the large measuring diaphragm (3) is in working position after a rotation of 180 degrees around the rotation axis (5). The contours, or rather, merely contour fragments of the measuring diaphragms (2 or 3, respectively) are applied inversely on the graticule. The contours may consist of solidly drawn lines, dotted lines, or points. It is also possible that only the corner points of rectangles are applied inversely onto the graticule (7) as contour fragments. These contours on the graticule (7) are light transmissive, so that in their projection corresponding bright images of these contours appear in the eyepiece intermediate image (19) of the observation path (B). FIG. 6 depicts such a line image (8). It consists of four inner bright crosses (10) that mark a small rectangle and centro-symmetrical four outer bright crosses (9) that mark a large rectangle. Thus the observer can see continuous contours or discontinuous contour fragments, respectively, of the available measuring diaphragm (2 or 3, respectively) in the form of bright markings in the microscope object image in the observation path (B).

In order not to simultaneously present the complete markings information of the graticule (7) to the observer, a mask plate (11) is mounted for rotation in the immediate vicinity and parallel to the graticule (7).

Figure 9:
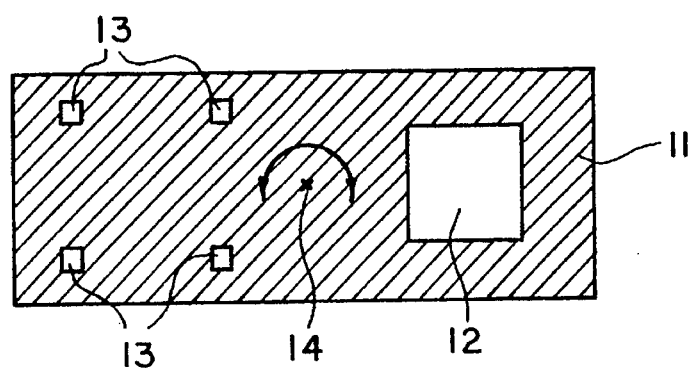
FIG. 9: a mask plate.

FIG. 9 shows that this mask plate (11) consists of opaque material and that it contains a first mask (12) which is square and a second system of small square masks (13). 14 indicates the intersection point of the rotation axis for the mask plate (11); the spherical double vector indicates that the mask plate (11) can be rotated 180 degrees.

Figure 10A:
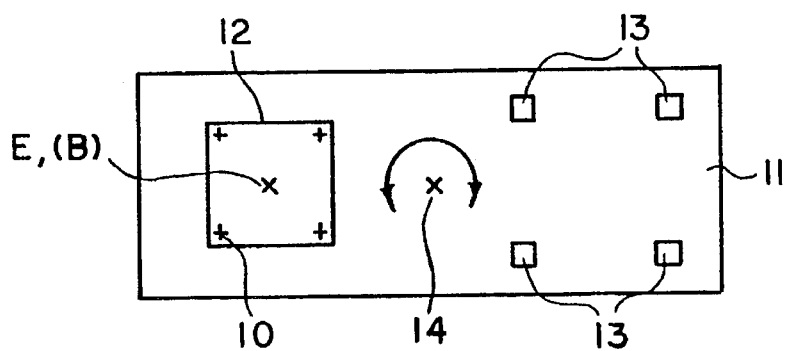
FIGS. 10a and 10b: different working positions of the mask plate in the projection path.
Figure 10B:
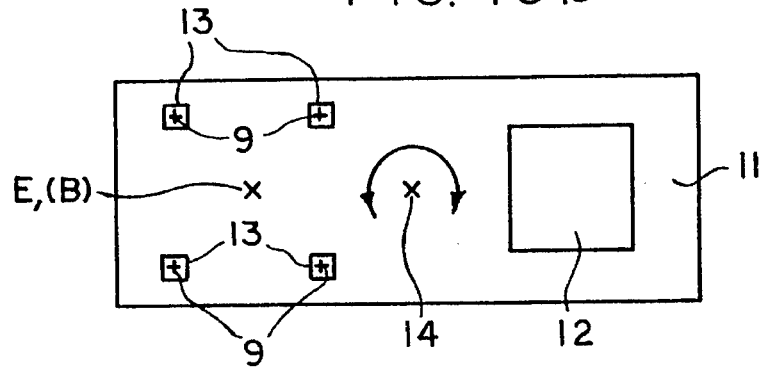

In FIG. 10a the mask plate (11) is in such a position that the mask (12) is in working position. This means that it is located in the area of the reflecting path (E). The reflecting path (E) originating from the light source (L) is covered by the mask plate (11) in such a way that it can only continue in the area of the square mask (12). Then it strikes the graticule (7) and just barely includes the contour fragments (10) while the also existing contour fragments (9) on the graticule (7) remain masked by the mask plate (7), thus they are hidden from the observer.

After rotation of the mask plate around the rotation axis (14) the four masks (13) are in working position, whereby they are arranged centro-symmetrically to the trace of the reflecting path (E). The four masks (13) clear the contour fragments (9) on the graticule (7) and their immediate surrounding area so that the images of the contour fragments (9) can be seen as bright crosses in the eyepiece intermediate image (19) when the light source (L) is switched on.

Through a synchronized movement of the measuring diaphragm plate (4) and the mask plate (11) near the graticule (7) it is thus possible to brightly depict a corresponding measuring diaphragm contour in the observation path (B) in addition to the chosen measuring diaphragm (2 or 3, respectively) in the measuring path (M). This can occur in the known way through the synchronizing device (16), which works in combination with the motors (6 or 15, respectively).

Figure 11A:
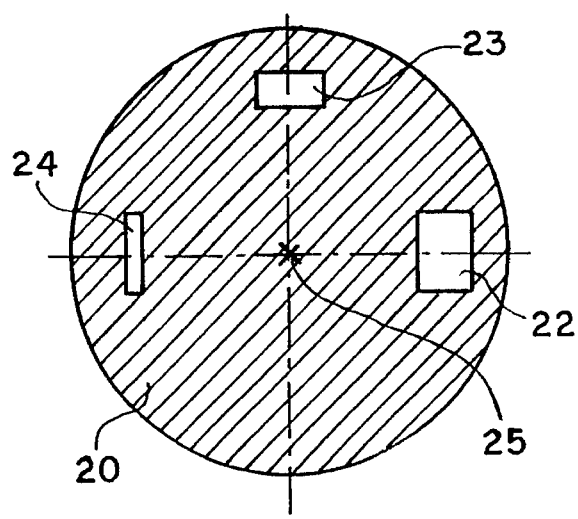
FIG. 11a: a measuring diaphragm disk with three square diaphragms.
Figure 11B:
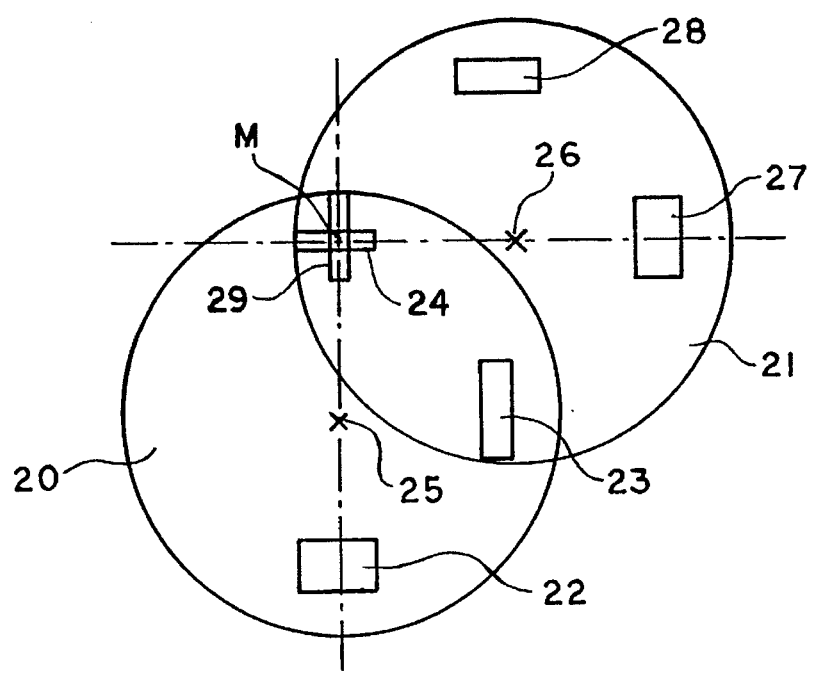
FIG. 11b: two partially overlapping measuring diaphragm disks in working position in the measuring path.
Figure 11C:
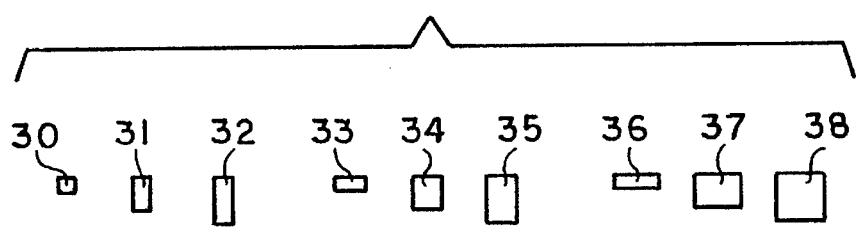
FIG. 11c: nine resulting measuring diaphragm forms.

FIGS. 11a to 11c depict a second design of this invention. FIG. 11a shows a measuring diaphragm disk (20) which consists of opaque material and is rotatably mounted, compare the trace of the rotation axis (25). The diaphragms (22 to 24) are arranged near its periphery. In the depicted case they are designed as rectangular diaphragms. If one places on the longitudinal sides of these slit-shaped diaphragms (22 to 24) their respective perpendicular bisectors, these will point toward the center point of the disk, which coincides with the intersection point of the rotation axis (25).

FIG. 11b shows two identical disks (20, 21) of the type depicted in FIG. 11a that partially overlap and are arranged parallel and close to each other. The intersection points of the rotation axis (25 and 26) as well as the intersection point of the optical axis of the measuring path (M) in the drawing plane form the corner points of a right triangle as depicted, whereby the right angle lies at the intersection point of the measuring path (M). The square diaphragms (24 and 29) that are in working position are located perpendicularly to each other in this geometric construction. It can be seen that only this small rectangular overlapping area of both diaphragms (24 and 29) in the area of the intersection point of the optical axis of the measuring path (M) represents a combined diaphragm opening, which is marked with the reference number 30 in FIG. 11c. The rectangular diaphragm (34) in FIG. 11c is to be realized in a corresponding way, so that the diaphragm (23) of the measuring diaphragm disk (20) and the diaphragm (28) of the measuring diaphragm disk (21) are superpositioned in the area of the measuring path (M). All other diaphragmgeometries that are depicted in FIG. 11c are producible through corresponding cyclical exchanges of all setting possibilities according to FIG. 11b.

The measuring diaphragm disk pair (20 and 21) depicted in FIG. 11b is positioned in place of the measuring plate (4) that is shown in FIG. 4. Analogously, a mask disk pair replaces the mask plate 11 in the projection path E, which is identical to the arrangement shown in FIG. 11b in that they contain square individual masks and regarding their arrangement on the two mask disks. The disk pair arrangements have the advantage, that diaphragms or masks respectively with different positions, forms and sizes can be depicted and brought into working position with synchronization. The geometry of the measuring diaphragm or the mask respectively is very insensitive towards the angular position of the disks because of this suggested arrangement. The result is a construction that is simple and not critical.

In a further design of this invention, the measuring diaphragms or masks may carry color or neutral filters respectively, in order to change the color or intensity of the reflected or light to be measured. Thereby it is also possible to emphasize certain parts of the graticule (7) through, e.g. color.

It is possible to use the design or the method according to this invention for photometry or for measurement of exposure times, in which the measurement values of several or all depictable measuring diaphragm configurations are consulted.

It is also possible to realize a projection of line images and pointers, e.g. through fading the actual part of a comprehensive, multifunctional line image, and to design a motorized automatic control of this projection of measuring marks (m-marks) displayed e.g. during exchange of the objectives.

Additional aberrations regarding the geometrical configurations of the diaphragms or the masks respectively lay within the frame of this invention.

List of labels and numbers

A—imaging path
B—observation path
E—projection path
M—measuring path
R—reverse reflection path
O—object
P—prism system
L—light source
T—triple mirror
1—visual field margin
2—small (square) measuring diaphragm
3—large (square) measuring diaphragm
4—measuring diaphragm plate
5—rotation axis of (4)
6—motor for (4)
7—graticule
8—line image of (7)
9—one of the four crosses (contour fragment of (3))
10—one of the four crosses (contour fragment of (2))
11—mask plate for (7)
12—mask for (10)
13—mask for (9)
14—rotation axis of (11)
15—motor for (11)
16—synchronizing device
17—electrical connection between (16) and (15)
18—electrical connection between (16) and (6)
19—eyepiece intermediate image plane
20,21 measuring diaphragm discs
22–24 diaphragms in (20)
25—rotation axis of (20)
26—rotation axis of (21)
27–29 diaphragms in (21)
30–38 measuring diaphragms
39—semi-transmissive surface
40—fixed measuring diaphragm
41—reflecting prism
42—graticule
43—variable measuring diaphragm
44—hinged mirror
45—conjugate plane

What is claimed is:

1. A method for a measurement of exposure times in optical devices having a microscope imaging path, an observation path, an intermediate image plane in said observation path, a measuring path, a photometric measuring device in said measuring path, a projection path, and a light source in said projection path, comprising the steps of:

installing a measuring diaphragm plate associated with said measuring path, said measuring diaphragm plate having a plurality of discrete measuring diaphragms, and providing diaphragm selection means for selectively positioning one of said plurality of measuring diaphragms in said measuring path;

providing a graticule in said projection path at a plane conjugate to said intermediate image plane, said graticule having light transmissive contour markings corresponding to contours of said plurality of discrete measuring diaphragms;

installing a mask plate associated with said projection path, said mask plate having a plurality of discrete masks corresponding to said plurality of measuring diaphragms, and providing mask selection means for selectively positioning one of said plurality of masks in said projection path proximate said graticule; and synchronizing said diaphragm selection means and said mask selection means such that a selected measuring diaphragm and its corresponding contour markings are simultaneously imaged at said intermediate image plane.

2. The method according to claim 1, wherein said diaphragm selection means includes a motor for rotating said measuring diaphragm plate to position a selected measuring diaphragm in said measuring path and said mask selection means includes a motor for rotating said mask plate to position a selected mask in said projection path, and a synchronizing device is connected to said motors for synchronizing said diaphragm selection means and said mask selection means.

3. The method according to claim 1, wherein light transmitted through said graticule contour marking corresponding to said selected measuring diaphragm is reflected to said observation path and imaged to appear as a bright contour marking at said intermediate image plane.

4. The method according to claim 1, wherein a plurality exposure times are successively evaluated and stored corresponding to a plurality of said measuring diaphragms.

5. A method for a measurement of exposure times in optical devices having a microscope imaging path, an observation path, an intermediate image plane in said observation path, a measuring path, a photometric measuring device in said measuring path, a projection path, and a light source in said projection path, comprising the steps of:

installing a pair of partially overlapping measuring diaphragm disks associated with said measuring path, each said measuring diaphragm disk having a plurality of discrete measuring diaphragms, and providing diaphragm selection means for selectively superimposing one of said plurality of measuring diaphragms from each said measuring diaphragm disk in said measuring path to form a plurality of resulting measuring diaphragms;

providing a graticule in said projection path at a plane conjugate to said intermediate image plane, said graticule having light transmissive contour markings corresponding to contour markings of said plurality of resulting measuring diaphragms;

installing a pair of partially overlapping mask disks associated with said projection path, each said mask disk having a plurality of discrete masks, and providing mask selection means for selectively superimposing one of said plurality of masks from each said mask disk in said projection path proximate said graticule to form a plurality of resulting masks corresponding to said plurality of resulting measuring diaphragms; and synchronizing said diaphragm selection means and said mask selection means such that a selected resulting measuring diaphragm and its corresponding contour markings are simultaneously imaged at said intermediate image plane.

6. The method according to claim 5, wherein a plurality exposure times are successively evaluated and stored corresponding to a plurality of said resulting measuring diaphragms.

7. The method according to claim 5, wherein light transmitted through the graticule contour marking corresponding to said resulting measuring diaphragm is reflected to said observation path and imaged to appear as a bright contour marking at said intermediate image plane.

8. A device for a measurement of exposure times in optical equipment having a microscope imaging path, an observation path, an intermediate image plane in said observation path, a measuring path, a photometric measuring device in said measuring path, and a projection path, comprising:

a) a measuring diaphragm plate having a plurality of measuring diaphragms with different dimensions, said measuring diaphragm plate being movably installed in a plane conjugate to said intermediate image plane and a surface of an object to enable positioning of a selected measuring diaphragm in said measuring path;

b) a light source and a graticule in said projection path, said graticule being positioned in a plane conjugate to said intermediate image plane, a mask plate having a plurality of masks respectively corresponding to said plurality of measuring diaphragms, said mask plate being movably installed adjacent to said graticule to enable positioning of a respective mask corresponding to said selected measuring diaphragm in said projection path; and c) a prism system having a semi-transmissive surface installed in said imaging path for causing said projection path to coincide with said observation path.

9. The device according to claim 8, wherein said graticule comprises light transmissive contour markings corresponding to contours of said plurality of measuring diaphragms.

10. The device according to claim 8, wherein said measuring diaphragm plate is connected to a first motor for rotation about an axis, said mask plate is connected to a second motor for rotation about another axis, and said first and second motors are controlled by a synchronizing device to ensure that said respective mask is positioned in said projection path when said selected measuring diaphragm is positioned in said measuring path.

11. The device according to claim 8, wherein color or neutral filters are mounted in said measuring diaphragms.

12. The device according to claim 8, wherein color or neutral filters are mounted in said masks.

13. A device for a measurement of exposure times in optical equipment having a microscope imaging path, an observation path, an intermediate image plane in said observation path, a measuring path, a photometric measuring device in said measuring path, and a projection path, comprising:

a) a pair of partially overlapping opaque measuring diaphragm disks associated with said measuring path, each said measuring diaphragm disk having a plurality of differently configured measuring diaphragms selectively positionable in said measuring path by rotation of said disk, said measuring diaphragms from said disks being combinable in said measuring path form a plurality of resulting measuring diaphragms in a plane conjugate to said intermediate image plane and a surface of an object;

b) a light source and a graticule in said projection path, said graticule being positioned in a plane conjugate to said intermediate image plane, a pair of partially overlapping opaque mask disks associated with said projection path, each said mask disk having a plurality of differently configured masks selectively positionable in said projection path by rotation of said mask disk, said masks from said mask disks being combinable in said projection path to form a plurality of resulting masks corresponding to said plurality of resulting measuring diaphragm; and c) a prism system having a semi-transmissive surface installed in said imaging path for causing said projection path to coincide with said observation path.

14. The device according to claim 13, wherein said graticule comprises light transmissive contour markings corresponding to contours of said plurality of resulting measuring diaphragms.

15. The device according to claim 13, wherein said pair of measuring diaphragm disks are identical with regard to geometry, dimensions, and position of their respective measuring diaphragms.

16. The device according to claim 13, wherein said pair of mask disks are identical with regard to geometry, dimensions, and position of their respective masks.

17. The device according to claim 13, wherein said measuring diaphragms and said masks are rectangular in geometry.

18. The device according to claim 17, wherein said measuring diaphragms are arranged on said measuring diaphragm disks in such a way that a perpendicular bisector erected from a longitudinal side of each measuring diaphragm intersects a rotational axis of a corresponding measuring diaphragm disk.

19. The device according to claim 17, wherein said masks are arranged on said mask disks in such a way that a perpendicular bisector erected from a longitudinal side of each mask intersects a rotational axis of a corresponding measuring diaphragm disk.

20. The device according to claim 13, wherein a trace of rotational axes of said pair of measuring diaphragm disks and said measuring path forms a right triangle and said measuring path intersects a vertex of a right angle of said triangle.

21. The device according to claim 13, wherein a trace of a rotational axes of said pair of mask disks and said projection path forms a right triangle and said projection path intersects the vertex of a right angle of said triangle.

22. The device according to claim 13, further including means for a synchronized resetting of said pair of measuring diaphragm disks and said pair of masks disks.

23. The device according to claim 13, wherein color or neutral filters are mounted in said measuring diaphragms.

24. The device according to claim 13, wherein color or neutral filters are mounted in said masks.

* * * * *